United States Patent
Adachi et al.

(10) Patent No.: US 8,365,545 B2
(45) Date of Patent: *Feb. 5, 2013

(54) INVERTER SYSTEM FOR ON-VEHICLE AIR CONDITIONER

(75) Inventors: Takehiro Adachi, Nagoya (JP); Koji Nakano, Nagoya (JP); Takashi Nakagami, Nagoya (JP); Makoto Hattori, Kiyosu (JP); Kazuki Niwa, Kiyosu (JP); Takayuki Takashige, Kiyosu (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 988 days.

This patent is subject to a terminal disclaimer.

(21) Appl. No.: 12/442,635

(22) PCT Filed: Sep. 28, 2007

(86) PCT No.: PCT/JP2007/069096
§ 371 (c)(1),
(2), (4) Date: Mar. 24, 2009

(87) PCT Pub. No.: WO2008/108020
PCT Pub. Date: Sep. 12, 2008

(65) Prior Publication Data
US 2010/0024457 A1 Feb. 4, 2010

(30) Foreign Application Priority Data
Mar. 6, 2007 (JP) ................. 2007-055211

(51) Int. Cl.
B60H 1/32 (2006.01)
H02P 27/00 (2006.01)
H02P 6/14 (2006.01)
(52) U.S. Cl. .................. 62/244; 318/400.3; 318/400.26

(58) Field of Classification Search .................. 62/230, 62/224, 244; 363/98, 132; 318/801, 400.26, 318/400.3
See application file for complete search history.

(56) References Cited

U.S. PATENT DOCUMENTS
5,595,064 A 1/1997 Ikeda et al.
(Continued)

FOREIGN PATENT DOCUMENTS
JP 10-071849 A 3/1998
JP 11-008994 A 1/1999
(Continued)

OTHER PUBLICATIONS
European Search Report dated Aug. 19, 2011, issued in corresponding European Patent Appliication No. 07828837.0.
(Continued)

*Primary Examiner* — Chen Wen Jiang
(74) *Attorney, Agent, or Firm* — Westerman, Hattori, Daniels & Adrian, LLP

(57) ABSTRACT

The present invention has an object to provide an on-vehicle air conditioner that can prevent breakage or the like caused by applying a high voltage. In an inverter system 20 that controls an operation of a motor 30 of a compressor for the on-vehicle air conditioner, a motor control microcomputer 24 operates by converting a voltage supplied from an on-vehicle battery power source 50 into a low voltage. Thus, the motor control microcomputer 24 is operated to perform failure diagnosis of a high voltage circuit Cb without a high voltage power source 40 being turned on. The failure diagnosis can be performed without power being supplied from the high voltage power source 40 to the high voltage circuit Cb, thereby preventing the high voltage circuit Cb from being broken by applying the high voltage even when there is some failure in the high voltage circuit Cb.

8 Claims, 2 Drawing Sheets

U.S. PATENT DOCUMENTS 5,963,442 A 10/1999 Yoshida et al.
7,977,900 B2 * 7/2011 Nakagami et al. ......... 318/400.3

FOREIGN PATENT DOCUMENTS

| JP | 2000-312488 A | 11/2000 |
| JP | 2000-324857 A | 11/2000 |
| JP | 3351330 B2 | 11/2002 |
| JP | 2002-354878 A | 12/2002 |
| JP | 2006-320180 A | 11/2006 |

OTHER PUBLICATIONS

Japanese Office Action dated Aug. 31, 2011, issued in corresponding Japanese Patent Application No. 2009-502427.
International Search Report of PCT/JP2007/069096, Mailing Date of Dec. 18, 2007.
Notice of Allowance dated Jul. 4, 2012, issued in corresponding Japanese Patent Application No. 2009-502427.

* cited by examiner

INVERTER SYSTEM FOR ON-VEHICLE AIR CONDITIONER

TECHNICAL FIELD

The present invention relates to an inverter system for an on-vehicle air conditioner.

BACKGROUND ART

A motor for driving a compressor that constitutes an on-vehicle air conditioner is controlled in its operation by an inverter system.

As shown in FIG. 2, a conventional inverter system 1 operates at a low voltage of about 5 V converted by a non-isolated DC-DC converter 4 from a high voltage of 100 V or more supplied from a high voltage power source 3 for driving a motor 2. The inverter system 1 communicates with a host ECU 6 via a communication interface 5 for controlling an on-vehicle air conditioner or the like. Other electrical equipment systems of a vehicle including the host ECU 6 or the like for the inverter system 1 operate at a voltage of 12 V or 24 V supplied from an on-vehicle battery power source 7. The high voltage for driving the motor 2 being applied to the other electrical equipment systems for some reasons may lead to a failure, and thus the inverter system 1 and the other electrical equipment systems can communicate with each other while being isolated by an isolated communication connector 8 such as a photocoupler (for example, see Patent Documents 1 and 2).

Patent Document 1: Japanese Patent No. 3152154
Patent Document 2: Japanese Patent No. 3351330

DISCLOSURE OF THE INVENTION

Problems to be Solved by the Invention

In recent years, with the advance of control of vehicles, failure diagnosis or the like of electrical equipment systems of the vehicles has been performed. However, in the conventional inverter system 1, a motor control microcomputer 9 that controls the inverter system 1 cannot be activated without starting up a high voltage power source 3. Specifically, communication between a host ECU 6 and the inverter system 1 cannot be established simultaneously with turning on an on-vehicle battery power source 7. Thus, failure diagnosis of a circuit that receives a supply of power from the high voltage power source 3 cannot be performed merely by turning on the on-vehicle battery power source 7.

When power is supplied from the high voltage power source 3 to the inverter system 1 for performing failure diagnosis, and a switching element 10 or the like for driving a motor 2 is short-circuited and broken, a high voltage may be applied from the high voltage power source 3 to the inverter system 1 to cause breakage of both the motor 2 and the inverter system 1 because the motor 2 and the inverter system 1 share a ground.

The present invention is achieved in view of these technical problems, and has an object to provide an inverter system for an on-vehicle air conditioner that can prevent breakage or the like caused by applying a high voltage.

Means for Solving the Problems

To achieve the above described object, the present invention provides an inverter system for an on-vehicle air conditioner that controls an operation of a motor for driving a compressor that constitutes the on-vehicle air conditioner, comprising: a switching element for rotationally driving the motor; a gate circuit for driving a gate of the switching element; a control circuit that controls a supply of a current to the gate circuit; and a communication interface that communicates with a host control circuit that issues a command to the control circuit from outside the inverter system. The inverter system for an on-vehicle air conditioner is characterized in that the inverter system is isolated from a first power source that applies a predetermined first voltage to the motor, and receives a supply of a voltage from a second power source that applies a second voltage lower than the first voltage to the host control circuit.

The inverter system may be isolated from the first power source and receive the supply of the voltage from the second power source using an isolated DC-DC converter.

Thus, even when a circuit to which the first voltage is applied from the first power source is short-circuited, the first voltage is not applied to the inverter system for an on-vehicle air conditioner, thereby preventing a failure in the inverter system for an on-vehicle air conditioner.

In the case where the inverter system further comprises a temperature detection circuit that detects a temperature of the switching element when the first voltage is applied from the first power source, the control circuit can perform diagnosis of the switching element on the basis of the temperature of the switching element detected by the temperature detection circuit, and store information indicating the diagnosis result in a diagnosis result information storage portion. If there is an abnormality in the switching element or the motor, the temperature of the switching element becomes high. Thus, the control circuit diagnoses whether the temperature of the switching element detected by the temperature detection circuit exceeds a predetermined upper limit. When the temperature of the switching element exceeds the predetermined upper limit, it can be diagnosed that there is an abnormality in the switching element or the motor.

Further, the control circuit can refer to the information indicating the diagnosis result stored in the diagnosis result information storage portion when receiving the supply of the voltage from the second power source with the first voltage being not applied from the first power source to the motor. When the information indicating the diagnosis result that "the temperature of the switching element exceeds the predetermined upper limit" is stored, control to stop a processing for driving the motor or the like can be performed on the basis of the historical information.

The information indicating the diagnosis result by the control circuit may be stored as historical information in the diagnosis result information storage portion, and retrieved in service or the like.

The control circuit may notify the host control circuit of the information indicating the diagnosis result stored in the diagnosis result information storage portion. Timing of notifying the host control circuit of the information indicating the diagnosis result is not limited, and the information may be notified to the host control circuit at the time when the temperature of the switching element exceeds the predetermined upper limit to cause the host control circuit to stop driving the motor, or historical information that "the temperature of the switching element exceeds the predetermined upper limit" may be stored in the host control circuit. In activating the system, the control circuit may refer to the information indicating the diagnosis result stored in the diagnosis result information storage portion and notify the host control circuit of the information when receiving the supply of the voltage from the second power source with the first voltage being not applied from the first power source to the motor.

In the case where the inverter system further comprises a current detection circuit that detects a current flowing from the high voltage power source to the switching element and notifies the control circuit of the detection result, the control circuit may refer to the detected value of the current by the current detection circuit and perform a failure diagnosis processing of the current detection circuit on the basis of whether the detected value is within a predetermined range when receiving the supply of the voltage from the second power source with the first voltage being not applied from the first power source to the motor.

In the case where the inverter system further comprises a voltage detection circuit that detects a voltage applied from the first power source to the switching element and notifies the control circuit of the detection result, the control circuit may refer to the detected value of the voltage by the voltage detection circuit and perform a failure diagnosis processing of the voltage detection circuit on the basis of whether the detected value is within a predetermined range when receiving the supply of the voltage from the second power source with the first voltage being not applied from the first power source to the motor.

Further, the control circuit may refer to the detected value of the temperature detection circuit or the temperature sensor and perform a failure diagnosis processing of the temperature detection circuit or the temperature sensor on the basis of whether the detected value is within a predetermined range when receiving the supply of the voltage from the second power source with the first voltage being not applied from the first power source to the motor.

The inverter system for an on-vehicle air conditioner may further comprise a converter that converts the voltage supplied from the second power source into a third voltage different from the first voltage and the second voltage and supplies the voltage to the control circuit. This converter is preferably isolated.

The communication interface may perform communication such as CAN (Controller Area Network) communication and serial communication.

Advantage of the Invention

According to the present invention, failure diagnosis of a circuit for driving a compressor that constitutes an on-vehicle air conditioner can be performed without applying a high voltage. This can provide an on-vehicle air conditioner that prevents a breakage caused by a high voltage and has a superior circuit protective function.

DESCRIPTION OF SYMBOLS

Figure 1:
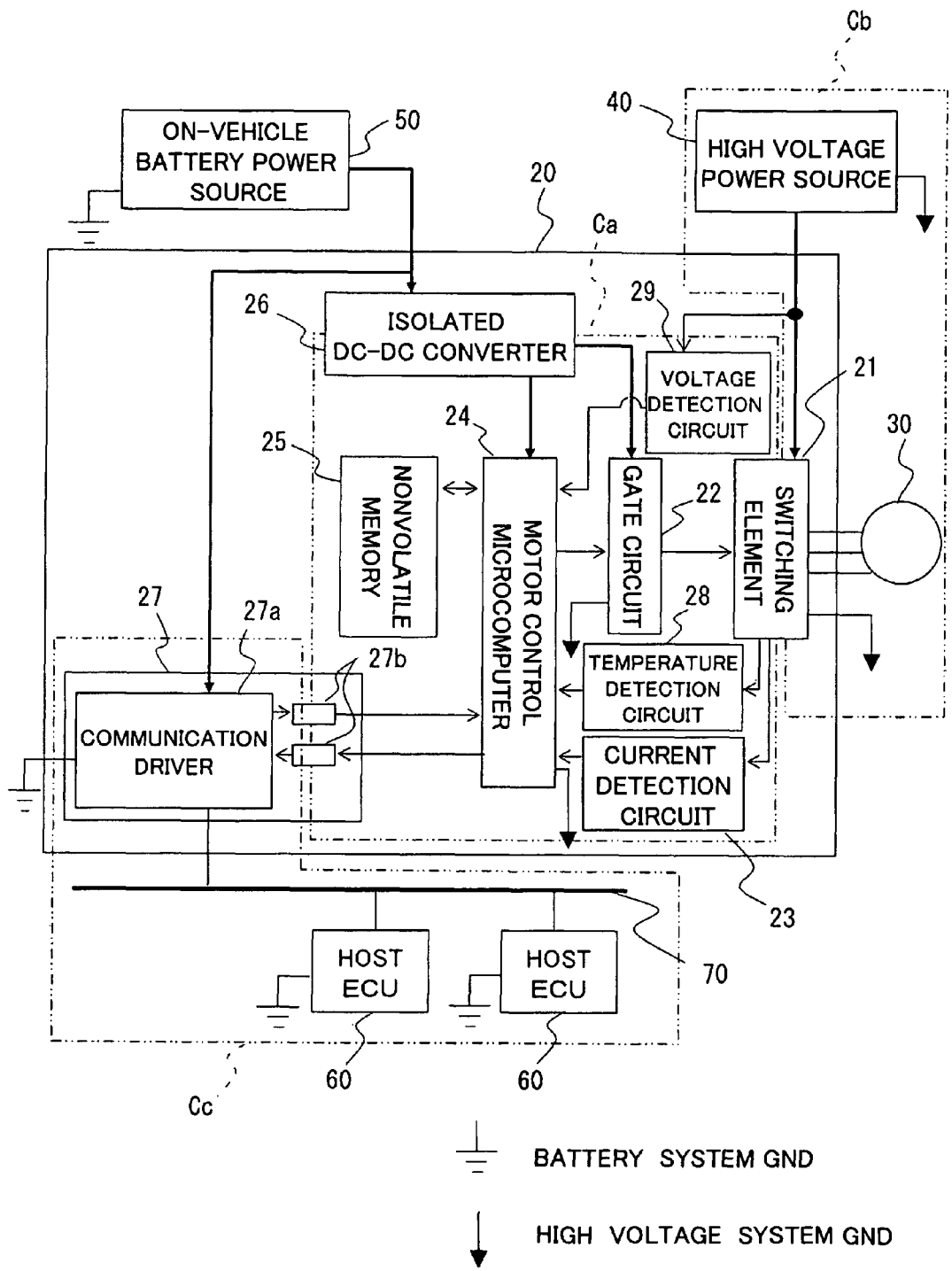
FIG. 1 illustrates a configuration of an inverter system for an on-vehicle air conditioner according to an embodiment.
Figure 2:
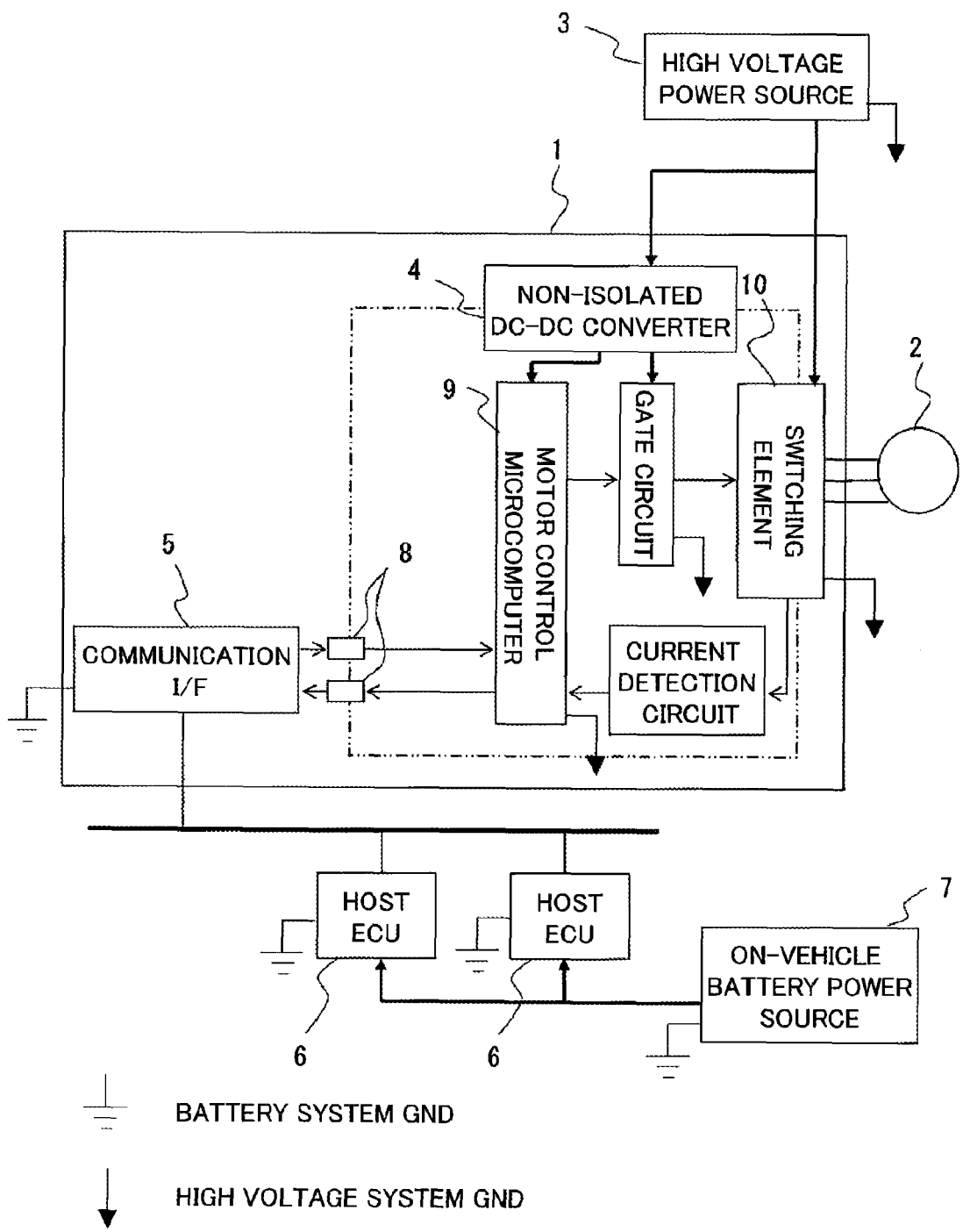
FIG. 2 illustrates a configuration of a conventional inverter system for an on-vehicle air conditioner.

20 . . . inverter system (inverter system for on-vehicle air conditioner)
21 . . . switching element
22 . . . gate circuit
23 . . . current detection circuit
24 . . . motor control microcomputer (control circuit)
25 . . . nonvolatile memory (diagnosis result information storage portion)
26 . . . isolated DC-DC converter
27 . . . communication circuit (communication interface)
27a . . . communication driver
27b . . . photocoupler
30 . . . motor
40 . . . high voltage power source (first power source)
50 . . . on-vehicle battery power source (second power source)
60 . . . host ECU (host control circuit)
70 . . . CAN bus
Ca . . . motor control circuit
Cb . . . high voltage circuit
Cc . . . electrical system circuit

BEST MODE FOR CARRYING OUT THE INVENTION

Now, the present invention will be described in detail on the basis of an embodiment shown in the accompanying drawings.

FIG. 1 illustrates a configuration of an inverter system (inverter system for an on-vehicle air conditioner) 20 according to an embodiment.

As shown in FIG. 1, the inverter system 20 controls to drive a motor 30 that is a drive source of a compressor that constitutes the on-vehicle air conditioner.

The inverter system 20 comprises a switching element 21, a gate circuit 22, a current detection circuit 23, a motor control microcomputer (control circuit) 24, and a nonvolatile memory (diagnosis result information storage portion) 25.

General vehicles are rated at 150 V or 300 V, and the motor 30 is driven by a high voltage (first voltage) of, for example, 150 V or 300 V supplied from a high voltage power source (first power source) 40 such as a high voltage battery or a generator.

The switching element 21 converts a DC current supplied from the high voltage power source 40 into a three-phase AC current and outputs the current to the motor 30 for driving the motor 30.

The gate circuit 22 drives a gate of the switching element 21 by control by the motor control microcomputer 24.

The current detection circuit 23 detects a current flowing from the high voltage power source (first power source) 40 to the switching element 21, and outputs the detected value to the motor control microcomputer 24.

The motor control microcomputer 24 performs feedback control of an output to the gate circuit 22 on the basis of the detected value of the current inputted from the current detection circuit 23.

A motor control circuit Ca of the inverter system 20 includes the switching element 21, the gate circuit 22, the current detection circuit 23, the motor control microcomputer 24, and the nonvolatile memory 25. The GND of the motor control circuit Ca has the same electrical potential (high voltage system GND) as that of the GND of a high voltage circuit Cb to which a high voltage is supplied from the high voltage power source 40.

The motor control circuit Ca operates at a low voltage (third voltage) of, for example, about 5 V. A voltage is supplied to the motor control circuit Ca by converting a battery voltage (second voltage) of, for example, 12 V or 24 V supplied from an on-vehicle battery power source (second power source) 50 into the low voltage with an isolated DC-DC converter 26. The DC-DC converter 26 is isolated, and isolates the motor control circuit Ca from another electrical system circuit Cc of a vehicle that operates with the battery voltage supplied from the on-vehicle battery power source 50.

The motor control microcomputer 24 controls to drive the motor 30 on the basis of a command signal from a host ECU (host control circuit) 60. Thus, the inverter system 20 can perform CAN communication with a CAN bus 70 for communication between ECUs that control on-vehicle electrical equipments via a communication circuit (communication interface) 27. The communication circuit 27 comprises a communication driver 27a that controls the CAN communication, and a photocoupler 27b for transmitting data between the communication driver 27a and the motor control microcomputer 24 while ensuring electrical isolation. An interface other than the photocoupler 27b may be used as long as data can be transmitted between the communication driver 27a and the motor control microcomputer 24 while ensuring electrical isolation.

In such an inverter system 20, the motor control microcomputer 24 has a function of diagnosing a failure in the high voltage circuit Cb. For example, when there is a failure in the motor 30 or the switching element 21 in the high voltage circuit Cb, a temperature of the switching element 21 becomes high if a voltage is applied and a current is supplied from the high voltage power source 40.

Thus, a thermistor (temperature sensor) provided in the switching element 21 detects the temperature of the switching element 21 and outputs the temperature as a resistance value of the thermistor to a temperature detection circuit 28. The temperature detection circuit 28 converts the resistance value of the thermistor into a voltage and outputs the voltage to the motor control microcomputer 24.

The motor control microcomputer 24 detects the voltage inputted from the temperature detection circuit 28 to monitor the temperature of the switching element 21, and determine whether the detected temperature exceeds a predetermined threshold (upper limit value). When the detected temperature exceeds the threshold, the motor control microcomputer 24 determines (diagnoses) that there is a failure in the motor 30 or the switching element 21.

When determining that there is a failure, the motor control microcomputer 24 can transmit information on the determination result to the host ECU 60 via the communication circuit 27 and the CAN bus 70.

The motor control microcomputer 24 stores historical information that the detected temperature of the switching element 21 exceeds the threshold or historical information that a failure occurs in the nonvolatile memory 25 such as an EEPROM. Then, the motor control microcomputer 24 refers to the nonvolatile memory 25 at the activation. When the historical information that a failure occurs is stored in the nonvolatile memory 25, the motor control microcomputer 24 can stop a processing for driving the motor 30 thereafter. When the historical information that a failure occurs is stored in the nonvolatile memory 25, the motor control microcomputer 24 can notify the host ECU 60 of the fact. In this case, the host ECU 60 may stop the processing for driving the motor 30 thereafter.

The historical information stored in the nonvolatile memory 25 can be also checked by connecting a diagnosis tool from outside the vehicle in service of the vehicle or the like. This allows retrieval of failure occurrence history.

The motor control microcomputer 24 can also perform failure diagnosis of the current detection circuit 23. When receiving the supply of the voltage from the on-vehicle battery power source 50 with the high voltage being not applied from the high voltage power source 40 to the motor 30, the current detection circuit 23 detects a current flowing from the gate circuit 22 to the switching element 21. The motor control microcomputer 24 can refer to the detected value of the current by the current detection circuit 23, determine whether the detected value is within a predetermined range, determine that there is a failure in the current detection circuit 23 when the detected value is outside the range, and perform a failure diagnosis processing of the current detection circuit 23.

A voltage detection circuit 29 may be further provided that detects a voltage applied from the high voltage power source 40 to the switching element 21 and notifies the motor control microcomputer 24 of the detection result. In this case, the motor control microcomputer 24 can monitor whether an abnormality occurs in the voltage applied from the high voltage power source 40 to the switching element 21 on the basis of whether the detected value of the voltage by the voltage detection circuit 29 is within a predetermined range in a normal operation state. When it is determined by monitoring that there is an abnormality in the voltage applied from the high voltage power source 40 to the switching element 21, a processing for stopping driving the motor 30 or the like can be performed.

When receiving the supply of the voltage from the on-vehicle battery power source 50 with the high voltage being not applied from the high voltage power source 40 to the motor 30, the motor control microcomputer 24 may refer to the detected value of the voltage by the voltage detection circuit 29 and perform a failure diagnosis processing of the voltage detection circuit 29 on the basis of whether the detected value is within the predetermined range. With the high voltage being not applied from the high voltage power source 40 to the motor 30, the detected value of the voltage by the voltage detection circuit 29 should be 0 V. When the detected value of the voltage by the voltage detection circuit 29 is outside the predetermined range, it can be diagnosed that there is an abnormality in the voltage detection circuit 29 itself.

Besides, when receiving the supply of the voltage from the on-vehicle battery power source 50 with the high voltage being not applied from the high voltage power source 40 to the motor 30, the motor control microcomputer 24 may refer to the detected value of the temperature detection circuit 28 or the thermistor of the switching element 21 and perform a failure diagnosis processing of the temperature detection circuit 28 or the thermistor of the switching element 21 on the basis of whether the detected value is within the predetermined range.

As such, self diagnosis of the inverter system 20 itself may be performed.

At this time, as described above, the motor control microcomputer 24 operates by converting the voltage supplied from the on-vehicle battery power source 50 into a predetermined low voltage. Thus, the failure diagnosis processing with reference to failure history of the motor 30 and the switching element 21 can be performed by operating the motor control microcomputer 24 without the high voltage power source 40 being turned on. Self diagnosis processings of the current detection circuit 23, the voltage detection circuit 29, the temperature detection circuit 28, the thermistor of the switching element 21 or the like may be performed by operating the motor control microcomputer 24 without the high voltage power source 40 being turned on.

Thus, when a user operates a key in using the vehicle and thus the voltage is applied from the on-vehicle battery power source 50 to the electrical equipment systems of the vehicle, failure diagnosis can be performed by the motor control microcomputer 24. The failure diagnosis can be performed without power being supplied from the high voltage power source 40 to the high voltage circuit Cb, thereby preventing the high voltage circuit Cb from being broken by applying the high voltage even when there is some failure. The motor control circuit Ca is driven by the power source different from the power source for the high voltage circuit Cb, and is thus not adversely affected.

The communication driver 27a of the communication circuit 27 also operates by converting the voltage supplied from the on-vehicle battery power source 50 into a predetermined low voltage. Thus, communication between the motor control microcomputer 24 and the host ECU 60 can be performed without the high voltage power source 40 being turned on.

Thus, the result of the failure diagnosis by the motor control microcomputer 24 performed without power being supplied from the high voltage power source 40 to the high voltage circuit Cb can be notified to the host ECU 60, and a start of driving the motor 30 can be stopped when there is a failure, thereby protecting the entire system. The historical information stored in the nonvolatile memory 25 can be also checked by connecting the diagnosis tool from outside the vehicle in service of the vehicle or the like, and also in this case, the nonvolatile memory 25 can be accessed simply by applying the voltage supplied from the on-vehicle battery power source 50 to the inverter system 20.

As such, with the above described configuration, the failure diagnosis of the circuit for driving the compressor that constitutes the on-vehicle air conditioner can be performed without applying the high voltage. This can provide an on-vehicle air conditioner that prevents a breakage caused by a high voltage and has a superior circuit protective function.

In the embodiment, the circuit configuration or the like of the inverter system 20 has been described, but the detailed configuration thereof may be changed as long as a function for implementing the gist of the present invention can be exhibited.

Further, the configuration described in the embodiment may be chosen or changed to other configurations without departing from the gist of the present invention.

The invention claimed is:

1. An inverter system for an on-vehicle air conditioner that controls an operation of a motor for driving a compressor that constitutes the on-vehicle air conditioner, comprising:
    a switching element for rotationally driving said motor;
    a gate circuit for driving a gate of said switching element;
    a control circuit that controls a supply of a current to said gate circuit; and
    a communication interface that communicates with a host control circuit that issues a command to said control circuit from outside said inverter system,
    wherein said inverter system is isolated from a first power source that applies a predetermined first voltage to said motor, and receives a supply of a voltage from a second power source that applies a second voltage lower than said first voltage to said host control circuit.

2. The inverter system for an on-vehicle air conditioner according to claim 1, wherein said inverter system further comprises a temperature detection circuit that detects a temperature of said switching element when said first voltage is applied from said first power source,
    said control circuit performs diagnosis of said switching element on the basis of the temperature of said switching element detected by said temperature detection circuit, and stores information indicating the diagnosis result in a diagnosis result information storage portion, and
    said control circuit refers to the information indicating said diagnosis result stored in said diagnosis result information storage portion when receiving the supply of the voltage from said second power source with said first voltage being not applied from said first power source to said motor.

3. The inverter system for an on-vehicle air conditioner according to claim 2, wherein said control circuit notifies said host control circuit of the information indicating said diagnosis result stored in said diagnosis result information storage portion.

4. The inverter system for an on-vehicle air conditioner according to claim 1, wherein said inverter system further comprises a current detection circuit that detects a current flowing from said first power source to said switching element and notifies said control circuit of the detection result, and
    said control circuit refers to the detected value of the current by said current detection circuit and performs a failure diagnosis processing of said current detection circuit on the basis of whether said detected value is within a predetermined range when receiving the supply of the voltage from said second power source with said first voltage being not applied from said first power source to said motor.

5. The inverter system for an on-vehicle air conditioner according to claim 1, wherein said inverter system further comprises a voltage detection circuit that detects a voltage applied from said first power source to said switching element and notifies said control circuit of the detection result, and
    said control circuit refers to the detected value of the voltage by said voltage detection circuit and performs a failure diagnosis processing of said voltage detection circuit on the basis of whether said detected value is within a predetermined range when receiving the supply of the voltage from said second power source with said first voltage being not applied from said first power source to said motor.

6. The inverter system for an on-vehicle air conditioner according to claim 1, wherein said inverter system further comprises an isolated converter that converts the voltage supplied from said second power source into a third voltage different from said first voltage and said second voltage and supplies the voltage to said control circuit.

7. The inverter system for an on-vehicle air conditioner according to claim 1, wherein said communication interface performs CAN (Controller Area Network) communication.

8. The inverter system for an on-vehicle air conditioner according to claim 1, wherein said inverter system is isolated from said first power source and receives the supply of the voltage from said second power source using an isolated DC-DC converter.

* * * * *